United States Patent [19]

Busch et al.

[11] 4,435,279

[45] Mar. 6, 1984

[54] METHOD AND APPARATUS FOR CONVERTING OIL FEEDS

[75] Inventors: Lloyd E. Busch; Charles W. Palmeter; Gerald O. Henderson; William M. Rice, all of Ashland, Ky.

[73] Assignee: Ashland Oil, Inc., Ashland, Ky.

[21] Appl. No.: 411,719

[22] Filed: Aug. 19, 1982

[51] Int. Cl.$^3$ .................. C10G 11/05; C10G 47/16
[52] U.S. Cl. .................................. 208/111; 208/113; 208/120
[58] Field of Search ................................ 208/120, 111

[56] References Cited

U.S. PATENT DOCUMENTS

| | | | |
|---|---|---|---|
| 3,406,112 | 10/1968 | Bowdes | 208/153 |
| 3,617,497 | 11/1971 | Bryson | 208/80 |
| 3,894,932 | 7/1975 | Owen | 208/74 |
| 3,894,936 | 7/1975 | Owen | 208/78 |
| 4,002,557 | 1/1977 | Owen et al. | 208/120 |
| 4,097,243 | 6/1978 | Bartholic | 208/164 X |
| 4,149,964 | 4/1979 | Bartholic | 208/153 |
| 4,316,794 | 2/1982 | Schoennagel | 208/111 |
| 4,332,673 | 6/1982 | Myers | 208/120 |
| 4,341,624 | 6/1982 | Myers | 208/120 |

OTHER PUBLICATIONS

Shankland and Schmitkons, "Determination of Activity and Selectivity of Cracking Catalyst", Proc. API 27 (III), 1947, pp. 57–77.

*Primary Examiner*—Delbert E. Gantz
*Assistant Examiner*—George Schmitkons
*Attorney, Agent, or Firm*—Richard C. Willson, Jr.; Carl D. Farnsworth

[57] ABSTRACT

Novel riser reactor design with associated multiple feed inlet means for contacting regenerated catalyst particles with low quality naphtha, $C_5$ minus wet gas product of hydrocarbon conversion and a residual oil feed comprising components boiling above about 1025° F. and comprising metal contaminants. Low quality naphtha from thermal cracking is charged either separately or in admixture with $C_5$ and lower boiling wet gas product of hydrocarbon conversion to the bottom portion of the riser conversion zone for contact with freshly regenerated zeolite cracking catalyst. The vaporous material thus charged conveys the regenerated catalyst at an acceptable velocity to an expanded section of the riser wherein residual oil is charged by a plurality of nozzle means penetrating the wall of the riser in the transition section to the expander user section. A suspension of hydrocarbon vapors and catalyst particles is then passed through the riser discharge for a desired contact time before separation by ballistic separation with a cup about the riser upper to the riser end.

14 Claims, 4 Drawing Figures

FIG. I
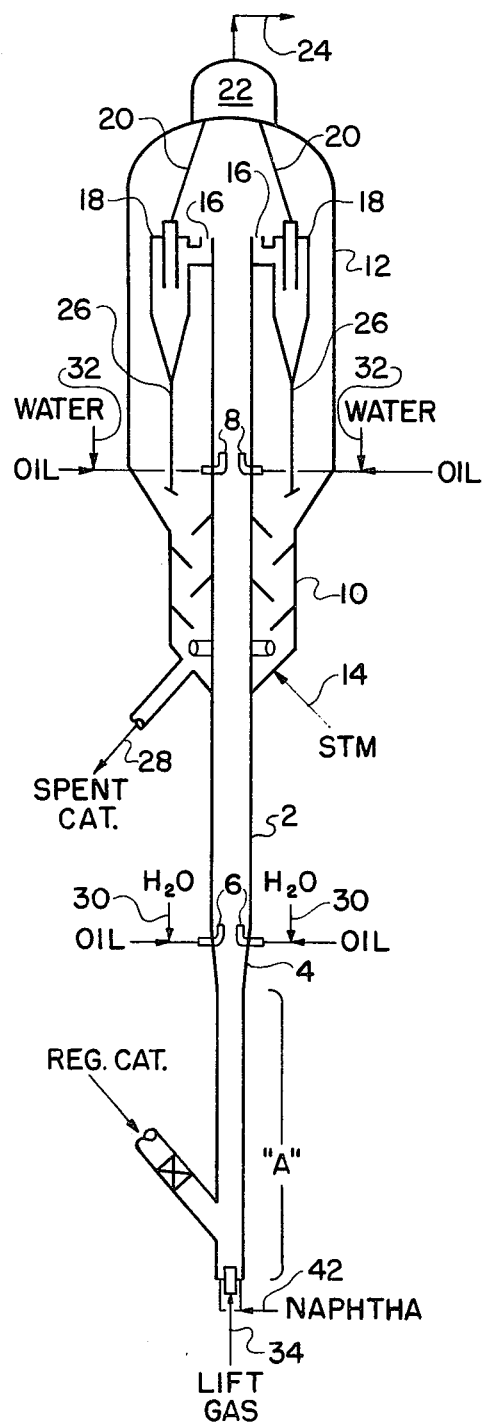
FIG. IV
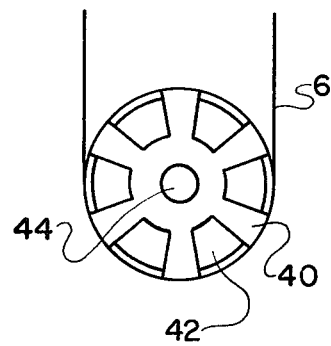
FIG. III
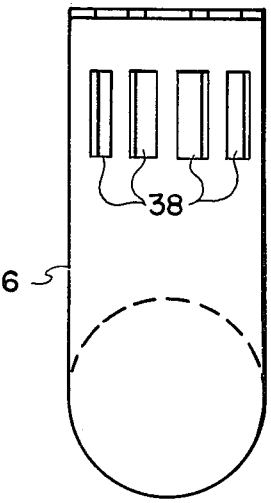

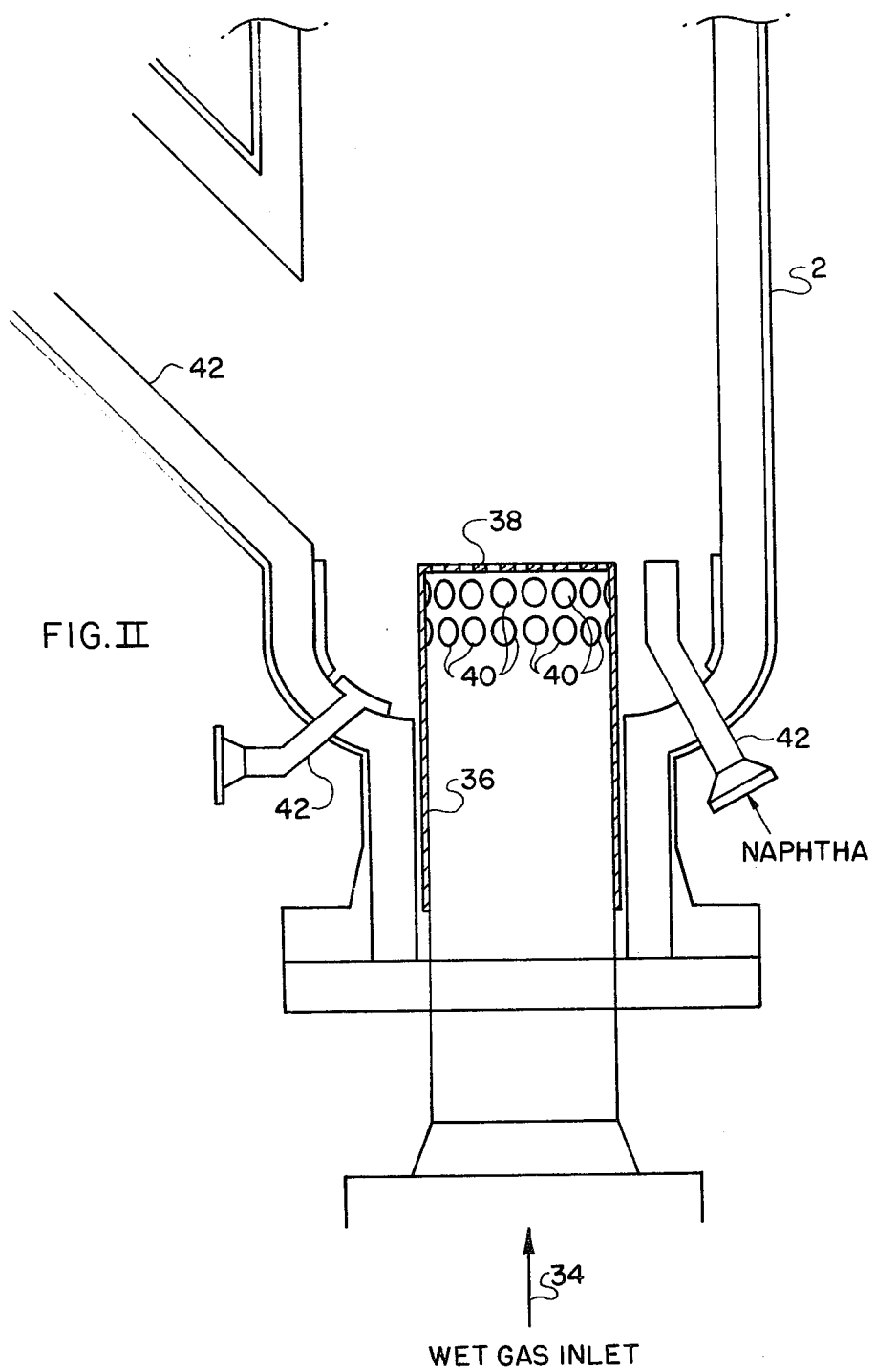

METHOD AND APPARATUS FOR CONVERTING OIL FEEDS

BACKGROUND OF THE INVENTION

Crude oils from which desired gaseous and liquid fuels are made contain a diverse mixture of hydrocarbons, sulfur and nitrogen compound and metal contaminants. The hydrocarbon compounds vary widely in molecular weight and therefore boil over a wide range. For example, crude oils are known in which 30 to 60% or more of the total volume of oil is composed of compounds boiling at temperatures above 650° F. Among these are crudes in which from about 10% to about 30% or more of the total volume consists of compounds so heavy in molecular weight that they boil above 1025° F. or at least will not boil below 1025° F. at atmospheric pressure.

Because these high boiling components of crude oil boiling above 650° F. are unsuitable for inclusion in gasoline and some higher boiling liquid hydrocarbon fuels, the petroleum refining industry has developed processes for separating and/or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a very restricted boiling range hydrocarbon feedstock is preferably caused to be cracked at an elevated temperature in contact with a cracking catalyst that is suspended in the feedstock under cracking conditions in a temperature range of 950° to about 1100° F. Upon attainment of a desired degree of molecular weight and boiling point reduction the cracking catalyst is separated from the obtained hydrocarbon vaporous conversion products.

Crude oils in the natural state contain a variety of materials which tend to have quite troublesome effects on FCC processes; and only a portion of these troublesome materials can be economically removed from the crude oil. Among these troublesome materials are coke precursors (such as asphaltenes, polynuclear aromatics, etc.), heavy materials (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, heavy metals in the feedstock can accumulate on the catalyst to the point that they unfavorably alter the composition of the catalyst and/or the nature of its catalytic effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy materials, especially nickel, on the catalyst act as a poison in some environments. They tend in varying degrees to promote excessive dehydrogenation and aromatic condensation, resulting in excessive production of carbon and gases with consequent impairment of liquid fuel yield. An oil such as a crude or a high boiling crude fraction or other source oil that is particularly abundant in metal contaminants such as nickel and/or other metals exhibiting similar behavior, while containing relatively large quantities of coke precursors, is referred to herein as one comprising metallo-organic compounds or as a carbometallic oil, and represents a particular processing challenge to the petroleum refiner to yield desired products such as gasoline, gasoline precursors and light cycle oils.

There has been a long standing interest in the catalytic conversion of carbometallic oils into gasoline and other liquid fuels. For example, in the 1950's it was suggested that a variety of carbometallic oils could be successfully converted to gasoline and other products in the Houdresid process. The Houdresid process employed catalyst particles of "granular size" (much larger than conventional FCC catalyst particle size) in a compact gravitating bed, rather than suspending catalyst particles in feed and product vapors in a fluidized catalyst bed system. The productivity of the process, compared to fluid catalytic cracking with lighter gas oils, was low. But the Houdresid process did offer some advantages. It appeared that the adverse effects previously encountered with heavy metals in the feed were not as great a barrier in the Houdresid process as one might expect in FCC processing. The heavy metal which accumulated on or near the outer surfaces of the catalyst particles apparently could be removed to some extent by an attrition process, which selectively removed an outer layer of metal-contaminated catalyst. The catalysts were very cheap, but also relatively inactive, and highly unsuitable by today's standards. While the maximum tolerable limit of heavy metal contamination on catalyst in fluid catalytic cracking was then thought to be about 200 parts per million, the Houdresid process did continue to operate satisfactorily even when the total nickel plus vanadium content of the catalyst bed reached 870 ppm. Moreover, it was found that the required levels of product selectivity could be maintained without withdrawing catalyst from the process, except to the extent that withdrawal was required by normal mechanical losses (e.g. attrition and inadvertent discharge with off gases) and by the attrition and inadvertent discharge with off gases) and by the attrition method used to control metals level. Today, such attrition of catalyst to fine particulates would present an expensive environmental problem, thus considerably increasing difficulties involved in practicing the process.

Although the Houdresid process obviously represented a step forward in dealing with the effects of metal contamination and coke formation on catalyst performance, its productivity was limited. Thus, for the many years which have passed since the Houdresid process was first introduced commercially, the FCC process art has continued an arduous search for suitable modifications or alternatives to the FCC process which would permit commercially successful operation on reduced crude and the like. During this operating and search period a number of proposals have been made; some have been used commercially to a certain limited extent.

Several proposals involve treating a heavy or high boiling oil feed to remove the metal therefrom prior to cracking, such as by hydrotreating, solvent extraction and/or complexing with Friedel-Crafts catalysts, but these techniques have been criticized as unjustified economically. Another proposal employs a combination cracking process having "dirty oil" and "clean oil" processing units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbometallic oil such as reduced crude with hot taconite pellets to produce gasoline. This is only a small sampling of many proposals which have appeared in the patent literature and technical reports for upgrading carbometallic oil feeds.

Notwithstanding the great effort which has been expended and the fact that each of these proposals overcomes some of the difficulties involved, conventional FCC practice today bears mute testimony to the dearth of carbometallic oil-cracking techniques that are both economical and highly practical in terms of technical feasibility. Some crude oils are relatively free of substantial coke precursors or heavy metal contaminants or both, and the most troublesome components of crude oil are for the most part concentrated in the highest boiling fractions thereof. It has been possible in the prior art to largely avoid the problems of coke precursors and heavy metals by sacrificing the liquid fuel yield which would be potentially available from the highest boiling fractions. More particularly, conventional FCC practice has employed as a part of the gas oil feedstock that fraction of crude oil which boils at about 650° F. to about 1000° F., such fractions being relatively free of heavy metal contamination. Such feedstock, known as "vacuum gas oil" (VGO) is generally prepared from crude oil by distilling off the fractions boiling below about 650° F. at about atmospheric pressure and then separating by further vacuum distillation from the heavier fractions a vacuum gas oil cut boiling from 650° F. up to about 900° F. or 1025° F.

A gas oil of atmospheric distillation in combination with vacuum gas oil is most often used as feedstock for prior art conventional FCC processing. The heavier fractions of the crude oil are normally employed for a variety of other purposes, such as for instance production of asphalt, residual fuel oil, #6 fuel oil, or marine Bunker C fuel oil, which represents a great waste of the potential value of this portion of the crude oil. This is especially true in light of the great effort and expense which the art has been willing to expend in the attempt to produce generally more suitable feed materials from coal and shale oils.

The present invention is particularly aimed at the cracking of gas oils with or without the heavier fractions of crude oils and particularly that portion thereof containing substantial quantities of both coke precursors, heavy metals, and other troublesome components either alone or in conjunction with the lighter more suitable oils, thereby potentially increasing the overall yield of gasoline and other desired gaseous and liquid fuels from a given crude oil. It is believed that the method and means comprising the process of this invention is uniquely advantageous for dealing with the problem of treating gas oils with and without high boiling carbometallic oils in an economically and technically sound manner.

In general, the coke-forming tendency or coke precursor content of an oil can be ascertained by determining the weight percent of the carbon remaining after a sample of that oil has been pyrolized. The industry accepts this value as a measure of the extent to which a given oil tends to form non-catalytic coke when employed as feedstock in a catalytic cracker. Two established tests are recognized, the Conradson Carbon and Ramsbottom Carbon Tests, the latter being described in ASTM Test No. D524-76. In conventional FCC practice, Ramsbottom carbon values on the order of about 0.1 to about 1.0 are regarded as indicative of acceptable feed. The present invention is concerned with the use of hydro-carbon feedstocks which have higher Ramsbottom carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed.

$$\text{Nickel Equivalents} = \text{Ni} + \frac{V}{4.8} + \frac{Fe}{7.1} + \frac{Cu}{1.23}$$

According to conventional FCC practice, the heavy metal content of a feedstock for FCC processing is controlled at a relatively low level, e.g. about 0.25 ppm Nickel Equivalents or less. The present invention is concerned with the processing of feedstocks containing metal contaminants substantially in excess of this value, and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In some known FCC prior art processes, in which a circulating inventory of catalyst is used again and again in the processing of fresh feed, with periodic and/or continuing minor addition and withdrawal of fresh and spent catalyst, the metal content of the catalyst is maintained at a level which may for example be in the range of about 200 to about 6000 ppm Nickel Equivalents. The process of the present invention is concerned with the use of catalyst having an accumulated large metals content, and which therefore has the potential in the absence of controls to promote dehydrogenation, aromatic condensation, gas production or coke formation.

SUMMARY OF THE INVENTION

The present invention is concerned with the catalytic conversion of crude oils known as residual oils and/or resids recovered as the bottoms products of atmospheric and/or vacuum distillation and containing substantial quantities of coke precursors and heavy metal contaminants, sulfur and nitrogen compounds. Sodium found in crude oil is also a troublesome component in deactivating particularly a crystalline zeolite cracking catalyst. Thus the combination method and process of this invention is a unique sequence of operating parameters designed to dispose of and/or handle undesirable components comprising a residual oil or a reduced crude in a manner permitting substantial conversion of high boiling hydrocarbon components in association therewith to more desirable gaseous and liquid fuel products and particularly those in the gasoline boiling range.

The combination of unique steps contributing to the novel combination of this invention represents a highly specialized and productive approach to the conversion and recovery of the product of catalytic conversion of high boiling residual oil feedstocks comprising carbometallic feed components such as found in topped crudes, residual oils, reduced crudes and resids. A petroluem crude oil and particularly the 650° F. plus portion thereof is characterized in the absence of further treatment as having a heavy metals content of at least about 5 ppm up to 50 ppm of Ni equivalents by weight and a carbon residue on pyrolysis of at least about 1% by weight.

Some hydrocarbon feeds which may be processed in the combination operation of this invention are specifically identified in Table 1 below.

This application is directed to improvements and different operating embodiments over that of copending application Ser. No. 6/304992 the subject matter of which application is incorporated herein by reference thereto.

riphery and arranged to direct fluid material only to the inside of a riser contact means.

FIG. IV is a top view of the segmented open upper end of the "L" shaped inlet means of FIG. III.

DISCUSSION OF SPECIFIC EMBODIMENTS

Referring now to FIG. I by way of example, there is shown a riser reactor 2 embodiment which departs from riser reactor 50, FIG. V of the above referenced copending application by providing an initial catalyst suspension forming lift section "A" employing one or a combination of lift gasiform materials such as a relatively inert lift gas such as steam, a wet gaseous product of thermal and/or catalytic cracking, either one of which is used alone or in conjunction with a low-quality naphtha product available to the process for catalytic upgrading such as a naphtha product of thermal cracking, coking, etc.

The riser reactor 2 is provided above section "A" with an expending transition section 4 which terminates in a larger diameter riser section there above and in which conversion of a residual oil feed is particularly effected. The expanded portion of riser 2 is provided with a plurality of feed inlet nozzles 6 adjacent the upper edge of the transition section which penetrates the riser wall and are of a configuration particularly identified with FIGS. III and IV more fully discussed below. In addition, oil feed inlet nozzles 8 are provided in a more down stream portion of the riser 2 thereby permitting more limited contact time between catalyst particles and oil feed within the riser before separating a formed suspension thereof. Thus, the riser 2 configuration of this invention permits relatively high temperature zeolite catalytic upgrading of thermal naphtha in a

TABLE 1

| Oil or Crude | API Grav. 650+[2] Total | Volume % of 650+ Fraction Boiling at | | Ramsbottom Carbon Content | | Wt. ppm Metals[3] | | | Ni Equiv. | Wt. % S in 650+ Total | Weight of Nitrogen (ppm) 650+ Fraction | | Wt. ppm Na |
|---|---|---|---|---|---|---|---|---|---|---|---|---|---|
| | | 650– 1025 | 1025+ | 650– 1025 | 1025+ | Ni | V | Fe | | | Total | Basic | |
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | 6.9 |
| Mexican Kurkuk[1] | 17.4 | | | | 9.30 | 35.0 | 99.0 | 17.0 | 58.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La./Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1]A refinery blend of Mexican and Kirkuk crudes.
[2]Throughout the table 650 and 1025 refer to 650° F. and 1025° F. respectively; 650+ refers to 650° F.+ material as defined below.
[3]Copper level was below 0.5%, except that Mexican Kirkuk contained 0.6%: all metals expressed as metal in ppm, based on the weight of the 650+ fraction.
[4]Calculated.

BRIEF DESCRIPTION OF THE DRAWINGS

FIG. I is a diagrammatic sketch in elevation of a riser reactor design and suspension separation means at the riser open upper end housed within a collector-stripper vessel for separated fluidizable solid particulates.

FIG. II is a diagrammatic sketch in elevation of the riser bottom arrangement for introducing more than one or more gasiform materials as reactant or lift gaseous material.

FIG. III is an end view diagrammatic sketch in elevation of an "L" shaped fluid material inlet means particularly showing slot passageways in the upper wall pebottom portion of the riser with or without the presence of lift gas such as steam or a wet gaseous product of the combination operation or obtained from either thermal or catalytic cracking and comprising some $C_5$ and lower boiling hydrocarbons as well as up to 10 or 15% by weight of process produced hydrogen. In addition, the oil feed inlet means or nozzles 6 and 8 permit substantial variation in contact time between oil feed and catalyst depending on which feed nozzles employed and suspension velocity employed in the riser. Generally speaking contact time between a residual oil feed and catalyst in the riser and depending on composition and source will be restricted to within the range of 0.5 to 5 seconds and more usually 3 seconds or less. In this operating environment it is contemplated charging catalyst particles to the riser bottom at a temperature within the range of 1300° F. to 1600° F. and in an amount sufficient to provide a desired catalyst to oil ratio and permit recovering hydrocarbons in the suspension from the riser discharge at a temperature within the range of 950° F. up to about 1100° F. Vaporous hydrocarbons separated from suspended catalyst particles at the riser discharge, preferably in the manner discussed below, are further separated and recovered much in the same manner as that disclosed in FIG. VII of the above identified copending application except as modified by the discussion below.

It will be recognized by those skilled in the fluid catalyst art, that the riser reactor 2 may be substantially any vertical length which will be compatble with an adjacent catalyst regeneration operation, catalyst stripping operation and conduit catalyst transfer means essential to the process whether the same or departing from that shown in the copending application above identified.

In the specific arrangement of FIG. I, the upper portion of riser 2 passes upwardly through and is coaxially aligned with an annular stripping section, open in the upper portion thereof with a vessel section 12 generally encompassing the upper discharge end of the riser reactor. Vessel section 12 confines catalyst particles separated from hydrocarbon vaporous products for transfer and settling downwardly into the annular stripping section 10. Stripping gas such as steam or other suitable gas is charged to a lower bottom portion of the stripping zone by conduit means 14 for flow upwardly through and countercurrent to downwardly flowing catalyst particles over a plurality of annular baffle members shown.

A most important aspect of the riser system of this invention is particularly directed to the method and means for separating the upwardly flowing suspension at the riser upper open end in a highly efficient manner. That is to say, the suspension in riser 2 is discharged from its upper open end at a velocity which will impart greater momentum to the particles of catalyst than to that imparted to the vaporous hydrocarbon products whereby the upward trajectory of the catalyst particles will separate themselves substantially from gasiform materials comprising vaporous hydrocarbon of catalytic conversion and separation of such gasiform material will be further enhanced by establishing a vapor or gasiform material withdrawal passageway of reduced internal pressure adjacent the upper open end of the riser reactor.

Separating the catalyst so discharged from the riser from recontact with hydrocarbon vapor may be enhanced considerably by providing a concave impingement surface spaced above the riser outlet which is located a distance at least equal to the riser diameter and more preferably is from 1.5 to 2 timer the riser diameter above the riser outlet. This concave impingement surface may be an upper head portion of vessel 12, a separate dish-shaped baffle means or a baffle arrangement comprising two half circular sections representing gull wings in cross section.

The velocity of the discharged suspension may vary over a relatively wide range depending upon the diameter of the riser discharge opening. It is important, however, that the mass-velocity component (momentum) of the hydrocarbon vapors should not be so high as to preclude achieving the separation desired. Suspension velocities at the riser discharge opening over the range of 50 to 100 feet per second have been found generally satisfactory with more optimum conditions permitting a separation of catalyst from hydrocarbon vapors up to about 90 percent.

In the specific arrangement of FIG. I, an annular cup means 16 open in the upper surface thereof adjacent the riser discharge opening, collects vapors for passage to cyclone 18 attached thereto by suitable confined passageway means. Vapors separated from entrained catalyst fines are removed by conduits 20 communicating with plenum 22 and withdrawal conduit 24. Catalyst fines separated in cyclones 18 are moved by diplegs 26 for passage to the annular stripping zone as a downwardly moving fluid bed of catalyst particles. Catalyst particles stripped in annular section 10 are withdrawn by conduit 28 for passage to a catalyst regeneration operation such as shown in the copending application above identified or other suitable catalytic regeneration arrangement to remove carbonaceous deposits of riser hydrocarbon conversion by combustion with oxygen containing gas.

It is contemplated modifying the arrangement of FIG. II to provide a smaller diameter vessel 12 and hanging cyclones 18 outside the vessel rather than inside as shown in the figure. On the other hand, it is also contemplated in some specific embodiments of eliminating the cyclones shown and recovering any entrained solid fines with vapors passed to a rough cut separation zone for recovery by liquid oil and separation by decantation for further use or disposal as required or desired.

It will be further recognized by those skilled in the art that the riser arrangement above discussed lends itself to other operating variations which include processing a lower boiling portion of crude oil comprising gas oils by injection by feed inlet means 6 and injecting a higher boiling portion of the crude oil by feed inlet means 8. It is also contemplated providing a third feed inlet feed means to riser 2 adjacent the bottom edge of the stripping zone whereby a topped crude or a residual portion of a crude oil may be introduced including vacuum gas oils and higher boiling materials comprising carbometallic impurities.

The hydrocarbon conversion operations contemplated to be accomplished in the riser arrangement of this invention rely upon the use of fluid particles of catalyst of a particle size in excess of 10 microns and providing an average particle size within the range of about 65 to about 90 and more usually not more than about 80 or 85 microns. The catalyst is preferably one comprising a crystalline aluminosilicate or crystalline zeolite achieved by rare earth exchange and dispersed in a matrix materials which may or may not have catalytic activity. A catalyst particularly suitable is a rare earth exchanged faujasite crystalline zeolite containing catalyst of a pore volume and matrix pore size openings which will collect and accumulate substantial quantities of metal contaminants and yet retain substantial catalyst cracking activity and selectivity. In this catalyst metals accumulation environment, it is contemplated adding atomizing or emulsion forming or both quantities of water with the feed and preferably process recovered sour water comprising sulfur compounds which can effect some passivation of metal components in the feed comprising nickel, vanadium, iron, and copper as major components. Thus, a residual oil portion of crude oil or any portion thereof charged to feed nozzle 6 may be mixed with process recovered sour water charged by conduit 30 or by conduits 32 to oil feed charged to feed nozzles 8.

FIG. II relates particularly to the bottom portion of section "A" of riser to which lift gas is added with or without naphtha addition as briefly identified above. In this figure, lift gas such as steam or a wet gaseous product of hydrocarbon conversion is charged by conduit 34 to a coaxially positioned cylindrical means 36 of smaller diameter than said riser 2. This cylindrical means 36 is perforated in its upper surface 38 for flow of gaseous material therethrough. In addition, the upper periphery of the cylinder is provided with a double row of openings 40 through which fluidizing gaseous material is passed to form a suspension with catalyst particles charged to the riser by standpipe means 42. Nozzle means 42 are provided for separately charging low quality naphtha when desired to a bottom portion of the riser. These nozzles means comprising about 6 nozzles positioned about cylindrical member 36 may discharge generally vertically upward as shown or they may be sloped slightly inward.

FIGS. III and IV are particularly concerned with the "L" shaped oil feed inlet means 6 or 8 briefly discussed above. FIG. III is an end view of the nozzle as viewed from inside the riser and shows a plurality of elongated slot passageways in the upper periphery thereof for directing charge oil towards the inside of the riser for distribution contact with upflowing catalyst suspended in wet gas product discussed above. FIG. IV shows the top surface of the "L" shaped nozzle conduit segmented with a plate means 40 provided with openings 42 through which the oil feed is charged for dispersion contact with upflowing particles of catalyst. Thus when employing a plurality of the pipe nozzles of FIGS. III and IV penetrating the wall of riser 2 and equally spaced from one another, it is evident that the nozzles will discharge upwardly and into the riser for contact with an upwardly flowing catalyst suspension formed as herein provided. An opening 44 may or may not be formed in member 40 as desired. The open area of slots 38 may be equal to or less than the combined open area in the top of the pipe nozzle represented by opening 42.

In a specific operating embodiment, it is contemplated forming a suspension of hot regenerated catalytically active faujasite zeolite containing cracking catalyst admixed with wet gaseous product of the process comprising $C_5$ and lower boiling hydrocarbons comprising up to 15 percent hydrogen and up to 10% water. This formed high temperature suspension is passed at a relatively low velocity upwardly through section "A" of the riser before entering the expanded riser section for contact with residual oil feed under hydrocarbon conversion conditions selected to produce gasoline precursors, gasoline and higher boiling light cycle oil. Charging the oil feed by inlet conduit 6 will provide a relatively long hydrocarbon residence time in the downstream portion of the riser up to about 2 seconds. However, charging the oil feed by inlet means 8 will severely limit the riser contact time to less than 1 second and as low as 0.5 seconds. It will be further recognized that the riser arrangement of FIG. I may also be employed in the thermal visbreaking operation of the above identified copending application and modified to delete the naphtha charge nozzles particularly discussed with respect to FIG. II.

Having thus generally discussed the method and means of this invention and described specific embodiments contributing to the improvements of this invention, it is to be understood that no undue restrictions are to be imposed by reasons thereof except as defined by the following claims:

We claim:

1. A method for upgrading crude oils and residual portions of crude oils comprising carbometallic impurities to produce gasoline and lower boiling components which
   A. passing a suspension of hot regenerated catalyst particles at a temperature in the range of 1300° to 1600° F. in a wet gaseous product of catalytic conversion comprising $C_5$ and lower boiling components upwardly from the bottom portion of a riser contact zone;
   B. contacting the suspension thus formed in a downstream portion of the riser with a residual portion of crude oil to provide the residual oil with a residence time in the riser reaction zone in the range of 0.5 or less up to about 6 seconds and sufficient to obtain vaporous products of catalytic conversion comprising substantial yields of gasoline boiling range components;
   C. initially separating said suspension of catalyst particles and vaporous products by imparting a greater momentum to said catalyst particles than said hydrocarbon vapors prior to discharge from the riser open upper end;
   D. substantially enhancing the separation of hydrocarbon vapors from catalyst particles of greater momentum discharged from the riser open end by establishing a zone of reduced pressure adjacent the riser open end comprising hydrocarbon vapors separated from catalyst particles by momentum differential; and
   E. withdrawing hydrocarbon vapors from said zone of reduced pressure in the substantial absence of catalyst particle entrainment.

2. The method of claim 1 wherein said vaporous hydrocarbons are passed from said reduced pressure zone by a confined passageway to a cyclone separation zone for separation into desired catalyst-vaporous components.

3. The method of claim 1 wherein a low quality naphtha product initially contacts suspended crystalline zeolite catalyst in a lower portion of the riser to form a suspension therewith and upgrade said Naphtha before contact with said residual oil.

4. The method of claim 1 wherein said cyclone separation zones are located within or outside a catalyst collecting and stripping zone about the upper end of said riser reaction zone.

5. The method of claim 1 wherein the residual oil feed is admixed with sour water before charge to said riser reactor zone above a transition section thereof to a larger diameter riser reaction zone section.

6. The method of claim 1 wherein the residual oil feed is charged to the riser below the discharge end thereof a distance sufficient to restrict the hydrocarbon residence time therein to within the range of 0.5 to 1.5 seconds.

7. The method of claim 1 wherein the residual oil feed is charged to the riser reaction zone by an "L" shaped feed nozzle zone provided with a plurality of separate open passageways in its upper dis-discharge cros-section end area and a wall portion thereof open to the inside of said riser adjacent its discharge end.

8. The method of claim 1 wherein the riser reaction zone is provided with a plurality of horizontally spaced apart "L" shaped nozzles penetrating the riser wall in one or more vertically spaced apart locations selected from a position adjacent the transition section increasing the riser diameter, positioned beneath but substantially adjacent the bottom of the annular stripping zone through which the riser passes, or positioned in the upper portion of the riser reaction zone wall and above the upper level of a bed of catalyst retained in the annular stripping zone.

9. A method for selectively converting a residual oil portion of crude oil comprising metallo-organic compounds, sulfur and nitrogen which comprises; initially forming a suspension of hot regenerated zeolite containing hydrocarbon conversion catalyst with a normally gaseous hydrocarbon catalytic conversion product comprising water and hydrogen; contacting said catalyst suspension with a residual oil feed emulsified with a sour water overhead product of said residual oil conversion operation at a hydrocarbon conversion temperature and for a time in the range of 0.5 up to about 3 seconds in a riser contact zone; separating the suspension upon discharge from the riser contact zone by establishing a momentum differential between particles of catalyst and hydrocarbon vapors and providing a reduced pressure annular vapor withdrawal zone about a high momentum catalyst stream which attracts vaporous hydrocarbons to the substantial exclusion of catalyst particles, and separately recovering catalyst particles and hydrocarbon vapors thus separated.

10. A method for catalytically converting light and heavier residual hydrocarbons of crude oil in the presence of a crystalline aluminosilicate cracking catalyst which comprises,
(a) initially forming a suspension of regenerated catalyst at a temperature within the range of 1300° to 1600° F. with a light naphtha product of thermal cracking in the lower bottom portion of a riser conversion zone for upflow therethrough,
(b) contacting said upflowing suspension in an upper diameter expanded section of said riser with a residual portion of a crude oil feed for a conversion residence time selected with the range of about 0.5 sec or less up to about 3 or more seconds,
(c) separating said suspension following traverse of said riser conversion zone at the riser outlet by establishing a momentum differential between particles of catalyst and vaporous material,
(d) withdrawing vaporous material into a zone of reduced pressure adjacent the riser outlet substantially reduced in entrained particles of catalyst and separating vaporous material thus withdrawn from entrained particles of catalyst in a cyclone separation zone, and
(e) collecting catalyst separated from vaporous material on a stripping zone for countercurrent contact with stripping gas.

11. The method of claim 10 wherein the residual oil feed is charged to the riser conversion zone through a plurality of separate "L" shaped feed inlet zones comprising openings providing parallel flow and perpendicular flow therefrom to said suspension flow.

12. The method of claim 10 wherein a gas oil portion of the heavier hydrocarbons is charged to the rising suspension in the riser beneath the lower level of the stripping zone and a higher boiling portion of the heavier hydrocarbons is charged to the rising suspension in the riser above the level of accumulated catalyst in the stripping zone.

13. The method of claim 10 wherein the suspension initially formed in a bottom position of the riser conversion zone comprises $C_5$ minus wet gas comprising hydrogen.

14. The method of claim 10 wherein the charged heavier residual hydrocarbons are mixed with sour water product of the process prior to being charged to the riser.

* * * * *